(12) United States Patent
Gurevich et al.

(10) Patent No.: US 7,610,275 B2
(45) Date of Patent: Oct. 27, 2009

(54) WORKING WITH TWO DIFFERENT OBJECT TYPES WITHIN THE GENERIC SEARCH TOOL

(75) Inventors: Elena Gurevich, Sandhausen (DE); Paola Sala, Heidelberg (DE); Alexander Zaichenko, Hockenheim (DE)

(73) Assignee: SAP AG, Walldorf (DE)

( * ) Notice: Subject to any disclaimer, the term of this patent is extended or adjusted under 35 U.S.C. 154(b) by 118 days.

(21) Appl. No.: 11/317,821

(22) Filed: Dec. 22, 2005

(65) Prior Publication Data

US 2007/0150446 A1 Jun. 28, 2007

(51) Int. Cl.
G06F 17/00 (2006.01)
G06F 17/30 (2006.01)
(52) U.S. Cl. ................. 707/3; 707/4; 707/5; 707/6; 707/101
(58) Field of Classification Search .......... 707/3, 707/4, 10, 101, 100; 705/9
See application file for complete search history.

(56) References Cited

U.S. PATENT DOCUMENTS

| | | | |
|---|---|---|---|
| 5,454,105 A * | 9/1995 | Hatakeyama et al. | ........... 707/2 |
| 5,628,004 A | 5/1997 | Gormley et al. | |
| 6,763,356 B2 * | 7/2004 | Borchers | ........... 707/10 |
| 6,768,997 B2 * | 7/2004 | Schirmer et al. | ........... 707/102 |
| 2002/0023077 A1 * | 2/2002 | Nguyen et al. | ........... 707/1 |
| 2002/0147704 A1 * | 10/2002 | Borchers | ........... 707/3 |
| 2003/0144924 A1 | 7/2003 | McGee | |
| 2004/0122807 A1 * | 6/2004 | Hamilton et al. | ........... 707/3 |
| 2004/0210479 A1 | 10/2004 | Perkowski et al. | |
| 2005/0050038 A1 * | 3/2005 | Kobayashi et al. | ........... 707/3 |
| 2005/0144162 A1 * | 6/2005 | Liang | ........... 707/3 |
| 2005/0267870 A1 * | 12/2005 | Everett-Church et al. | ........... 707/3 |
| 2006/0080295 A1 * | 4/2006 | Elsaesser et al. | ........... 707/3 |
| 2007/0011142 A1 * | 1/2007 | Sattler et al. | ........... 707/3 |

FOREIGN PATENT DOCUMENTS

DE EP 1 522 938 4/2005

OTHER PUBLICATIONS

Mei Kobayashi; Information retrieval on the web; 2000; ACM; ACM Computing Surveys, vol. 32, issue 2 Jun. 2000; pp. 144-173.*
European Search Report issued Feb. 13, 2007 in counterpart EP Application No. 06 02 1547.

* cited by examiner

*Primary Examiner*—Kuen S Lu
*Assistant Examiner*—Jermaine Mincey
(74) *Attorney, Agent, or Firm*—Kenyon & Kenyon LLP (57) ABSTRACT

A computer implemented method of carrying out a search of one or more databases on the basis of a search request from one or more applications, the method comprising: carrying out a first search of the one or more databases for objects having a first object type on the basis of a search request from one of the one or more applications; providing the one of the one or more applications with a first list of results; making a copy of the results of the first search; saving the copy of the results of the first search in a buffer; carrying out a second search of the one or more databases for objects having a second object type on the basis of a search request from the one of the one or more applications; providing the one of the one or more applications with a second list of results; restoring to the one of the one or more applications the first list of results from the buffer.

18 Claims, 9 Drawing Sheets

Enter Invoice Centrally

[Post] [Hold] [Refresh] [Check] [Change] [Display] [Delete] [Cancel/Reverse]
           50
[Send via XML] [Create Subsequent Debit] [Create Subsequent Credit] [Evaluate]

Basic Data (Invoice Number: 5648)

To process the invoice, click on an active pushbutton.

| | | | |
|---|---|---|---|
| Invoicing Party* | 1006–Blacks AG | Total amount* | 82.80 EUR |
| Invoice Recipient | 1000–IDES AG | | [Calculate Total Amount] |
| Invoice Date | 09/22/2005 | Total Tax | 10.80 EUR |
| Invoice Number (External)* | BLABLABLA | Incidental Costs | 0.00 EUR |
| Vendor* | 1000–C.E.B. BERLIN | Terms of Payment | [Calculate Taxes] |

Area Basic Data (Invoice Number: 5648)

[Header Data] [Item Data] [Exceptions]
  48

☐ Display Item Type in Item Overview

Item Overview

Filter: [Not Open for Invoice (2) ▼]

| ☐ | Item | Description* | Net Value* | Quantity | Unit | Net Price | Tax | Purchase Order / Item | Assigned to | G/L Account | Actions |
|---|---|---|---|---|---|---|---|---|---|---|---|
| ☑ | 1 | Material mit Preis und Lieferant | 60.00 EUR | 5 | ST | 12.00 EUR Per 1 ST | 16% | 7600005227 / 1 | Cost center 1000 | 400000 | 🔍 📋 📄 |
| ☑ | 2 | Suresh's product SR_100 | 12.00 EUR | 3 | EA | 4.00 EUR Per 1 EA | 16% | 7600005227 / 2 | Cost center 1000 | 400000 | 🔍 📋 📄 |

Total Amount (without tax): 72.00 EUR

*Required Entry

Back to Initial Screen

Display and Process Invoices/Credit Memos Centrally
To add one or more purchase orders to the current invoice, first find a purchase order

Search for Purchase Order

| Purchase Order Number | Requester | Vendor | Timeframe |
|---|---|---|---|
| | | 1000  C.E.B.BERLIN | Last 30 Days |

Area for input Fields

Start  Extended Search

To add purchase orders to an invoice, select the purchase orders and choose "Add Purchase Orders" below.

Search Result: 85 Purchase Orders

| | | Number | Name | Created by | Posting Date |
|---|---|---|---|---|---|
| ☐ | ▲ | 7600005118 | TS | Christoph Purchaser1 | 09/02/2005 |
| ☐ | ▲ | 7790002529 | bk2_PURCHASER1 08/30/2005 01:11 | Christoph Purchaser1 | 08/30/2005 |
| ☑ | ▲ | 7600005037 | hr222 | Christoph Purchaser1 | 08/29/2005 |
| ☑ | ▲ | 7600005036 | hr111 | Christoph Purchaser1 | 08/29/2005 |
| ☐ | ▲ | 7600004963 | PURCHASER1 08/25/2005 07:05 | Christoph Purchaser1 | 08/25/2005 |
| ☐ | ▲ | 7600004972 | PURCHASER2 8/25 koba001 | Christoph Purchaser1 | 08/25/2005 |
| ☐ | ▲ | 7790002555 | so PURCHASER1 08/24/2005 09:48 | Christoph Purchaser1 | 08/24/2005 |
| ☐ | ▲ | 7600004933 | JPY test | Japanese User PURCHASERJA | 08/24/2005 |
| ☐ | ▲ | 7600004908 | JPY test | Japanese User PURCHASERJA | 08/24/2005 |
| ☐ | ▲ | 7600004904 | PURCHASER1 IV test koba002 | Christoph Purchaser1 | 08/24/2005 |
| ☐ | ▲ | 7600004867 | PURCHASER1 08/24/2005 06:30 | Christoph Purchaser1 | 08/24/2005 |
| ☐ | ▲ | 7600004900 | test ka 1 | Christoph Purchaser1 | 08/24/2005 |
| ☐ | ▲ | 7600004897 | てすとかう3 | Christoph Purchaser1 | 08/24/2005 |
| ☐ | ▲ | 7600002554 | test ka-1 | Christoph Purchaser1 | 08/24/2005 |
| ☐ | ▲ | 7600004896 | wsh demo | Workflow System | 08/23/2005 |
| ☐ | ▲ | 7790002552 | CHERYL SECRETARY1 23.08.2005 20:25 | Hans Secretary1 | 08/23/2005 |
| ☐ | ▲ | 7790002551 | Intel Ed Shopping Cart Unsourced | Hans Secretary1 | 08/23/2005 |
| ☐ | ▲ | 7790002540 | SECRETARY1 23.08.2005 20:25 | Hans Secretary1 | 08/23/2005 |
| ☐ | ▲ | 7790002539 | Craigs SC 08.23.05 | Hans Secretary1 | 08/23/2005 |
| ☐ | ▲ | 7790002543 | wsh test | Hans Secretary1 | 08/23/2005 |

<< < 1-20 From 85 > >>

Add Purchase Order(s)

FIG. 8

| Select: | Invoice | ▶ | Create | | | | | | |
|---|---|---|---|---|---|---|---|---|---|
| Display | | | | | | | | | |

To display or edit invoices, first find an invoice.

Find Invoice/Credit Memo

| Purchase Order Number | Invoice Number (Internal) | Status |
|---|---|---|
| | | Held ▶ |

Timeframe: Last 30 Days ▶

Start  Extended Search

To display or edit invoices, choose the number below or 🔍

Search Result: 54 Documents

| Number | Name | Invoice Number (external) | Created by | Posting Date | Created on | Status | Action |
|---|---|---|---|---|---|---|---|
| 5788 | gfgdfgjklhölhklbhölhlökhöhlö | | Christoph Purchaser1 | | 09/13/2005 | Held | 🔍 |
| 5807 | sdsdfsdfsdfsdfsdfsdfsdfsdfdfsd | | Christoph Purchaser1 | | 09/13/2005 | Held | 🔍 |
| 5775 | fgdgf | | Christoph Purchaser1 | | 09/13/2005 | Held | 🔍 |
| 5774 | gffgdfgdfgdf | | Christoph Purchaser1 | | 09/13/2005 | Held | 🔍 |
| 5787 | dfsdfsdfsd | | Christoph Purchaser1 | | 09/13/2005 | Held | 🔍 |
| 5786 | fggdgd | | Christoph Purchaser1 | | 09/13/2005 | Held | 🔍 |
| 5805 | dddddddddddddd | | Christoph Purchaser1 | | 09/13/2005 | Held | 🔍 |
| 5784 | ghhgfhgfhgfd | | Christoph Purchaser1 | | 09/13/2005 | Held | 🔍 |
| 5783 | lhflhdlfshdlfsd | | Christoph Purchaser1 | | 09/13/2005 | Held | 🔍 |
| 5782 | dfkljhdlfhsdl | | Christoph Purchaser1 | | 09/13/2005 | Held | 🔍 |
| 5781 | lgldfjhgldhfg | | Christoph Purchaser1 | | 09/13/2005 | Held | 🔍 |
| 5740 | | LALALALA | Christoph Purchaser1 | | 09/13/2005 | Held | 🔍 |
| 5739 | | CGFSGFSDF | Christoph Purchaser1 | | 09/13/2005 | Held | 🔍 |
| 5738 | | | Christoph Purchaser1 | | 09/13/2005 | Held | 🔍 |
| 5709 | PURCHASER1 09/05/2005 01:00 | 4711 | Christoph Purchaser1 | 09/30/2005 | 09/09/2005 | Recording Completed | 🔍 |
| 5701 | | 1234 | Christoph Purchaser1 | 09/09/2005 | 09/09/2005 | Held | 🔍 |
| 5689 | | 1234 | Christoph Purchaser1 | 09/09/2005 | 09/09/2005 | Held | 🔍 |
| 5665 | | RETRETE | Christoph Purchaser1 | 09/16/2005 | 09/09/2005 | Recording Completed | 🔍 |
| 5648 | qx rechnunsname | BLABLABLA | Christoph Purchaser1 | 09/22/2005 | 09/08/2005 | Recording Completed | 🔍 |
| 5524 | PURCHASER1 09/03/2005 07:02 | | Dr.Sylvie Employee1 | | 09/06/2005 | Held | 🔍 |

<< < 1-20 From 54 > >>   Local intranet

FIG.9

WORKING WITH TWO DIFFERENT OBJECT TYPES WITHIN THE GENERIC SEARCH TOOL

FIELD OF THE INVENTION

A computer implemented method of carrying out a search of one or more databases on the basis of a search request from one or more applications, an article, a system, a user terminal and a computer readable storage medium The invention relates to a computer implemented method of carrying out a search of one or more databases on the basis of a search request from one or more applications, an article, a system, a user terminal and a computer readable storage medium.

BACKGROUND OF THE INVENTION

Business software systems, such mySAP's Supplier Relationship Management (SRM), include a plurality of applications. Such software systems support a user in ordering, delivering and invoicing goods, through a variety of processes. In such systems each application works with certain object or objects. The objects have a certain type, respectively. The object types may vary from object to object depending on the application. For example, in one application, the object type may be a shopping cart. In a different application, the object type may be a purchase order. A search tool is provided to allow objects to be searched for. In particular, a generic search tool has been developed which is not application specific. Using the generic search tool, a plurality of the applications in the system, can use the same search tool. Using a conventional generic search tool, a list of objects of a certain type can be found. A problem with the conventional search tool is that, it is not possible to search for objects of another type. Whilst the conventional generic search tool can work with a plurality of applications, it can only work with one object type at a time. If it is desired to search for objects of another type, the list of objects of the first type is lost.

It is desirable to address those drawbacks identified in conventional systems. In particular, it is desirable to improve the generic search tool. It is desirable to provide a generic search tool which can search for a plurality of different object types.

SUMMARY OF THE INVENTION

To address the above mentioned problems, there is provided according to a first aspect of the invention, a computer implemented method of carrying out a search of one or more databases on the basis of a search request from one or more applications, the method comprising: carrying out a first search of the one or more databases for objects having a first object type on the basis of a search request from one of the one or more applications; providing the one of the one or more applications with a first list of results; making a copy of the results of the first search; saving the copy of the results of the first search in a buffer; carrying out a second search of the one or more databases for objects having a second object type on the basis of a search request from the one of the one or more applications; providing the one of the one or more applications with a second list of results; restoring to the one of the one or more applications the first list of results from the buffer.

In this way, it is possible to search for a plurality of object types without having to carry out the search for the original list again. The performance of the system is improved. Further, the search for a plurality of object types can be carried out in the same time as a search for one object type. Further, all the search results regardless of object type are stored. Further, the processing of the buffer is fulfilled dynamically. The buffer can be restored more quickly than in conventional systems. The functionality can be used by any application using the generic search tool in a convenient manner without requiring great coding efforts. Thus, the search capability of the system is improved.

In a further embodiment, when a user works with the list, the system provides check boxes which the user can select. For example, he may select some purchase orders. He may then go to other screens. When he comes back to the screen including the list, the same orders are provided. In this way, the user can keep track of the amount of work he has to do.

According to a second aspect of the invention, there is provided an article comprising a machine readable medium that stores machine-executable instructions that when applied to a machine, cause the machine to carry out a search of one or more databases on the basis of a search request from one or more applications, wherein the machine is further caused to: carry out a first search of the one or more databases for objects having a first object type on the basis of a search request from one of the one or more applications; provide the one of the one or more applications with a first list of results; make a copy of the results of the first search; save the copy of the results of the first search in a buffer; carry out a second search of the one or more databases for objects having a second object type on the basis of a search request from the one of the one or more applications; providing the one of the one or more applications with a second list of results; restore to the one of the one or more applications the first list of results from the buffer.

According to a third aspect of the invention, there is provided a system for carrying out a search of one or more databases on the basis of a search request from one or more applications, the system comprising: an executable memory for storing the one or more applications and a search tool; one or more databases for storing objects of a first and a second type; a processor coupled to the executable memory and the one or more databases, the processor being operable to execute the one or more applications and the search tool, such that the search tool searches the one or more databases for objects having a first object type on the basis of a search request from one of the one or more applications; the one of the one or more applications is provided with a first list of results; the search tool makes a copy of the results of the first search; the search tool saves the copy of the results of the first search in a buffer; the search tool carries out a second search of the one or more databases for objects having a second object type on the basis of a search request from the one of the one or more applications; providing the one of the one or more applications with a second list of results; the search tool restores to the one of the one or more applications the first list of results from the buffer.

According to a fourth aspect of the invention, there is provided a user terminal comprising means operable to perform the method according to the present invention. According to a fifth aspect of the invention, there is provided a computer readable storage medium storing a program which when run on a computer controls to perform the method according to the present invention

BRIEF DESCRIPTION OF THE DRAWINGS

FIGS. 4 to 9 depict screen shots of an example according to an embodiment of the invention, in which purchase orders are searched to be added to an invoice. Like reference numerals indicate like elements.

DETAILED DESCRIPTION

Figure 1:
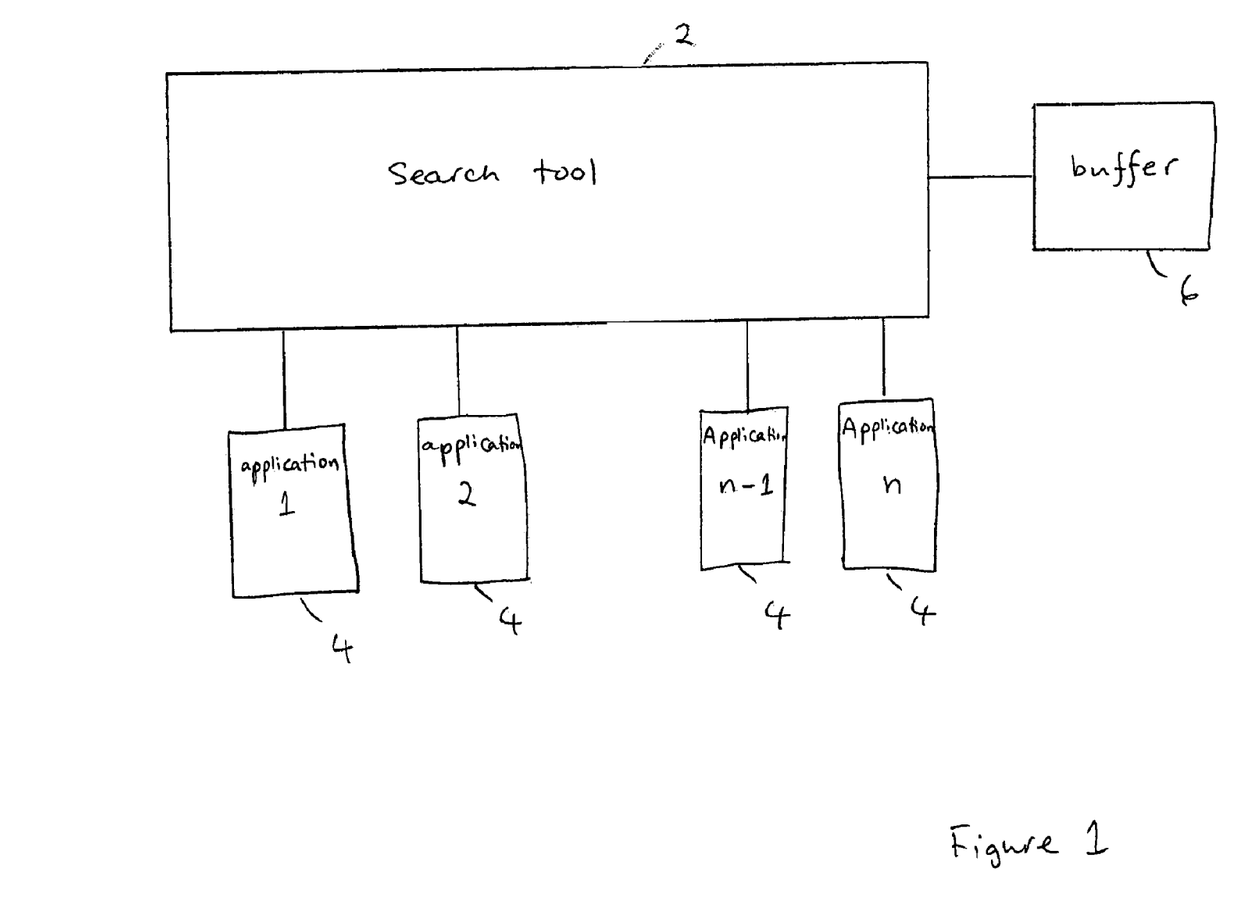
FIG. 1 shows a block diagram of a computer based system including a search tool and a plurality of applications according to an embodiment of the invention.
Figure 3:
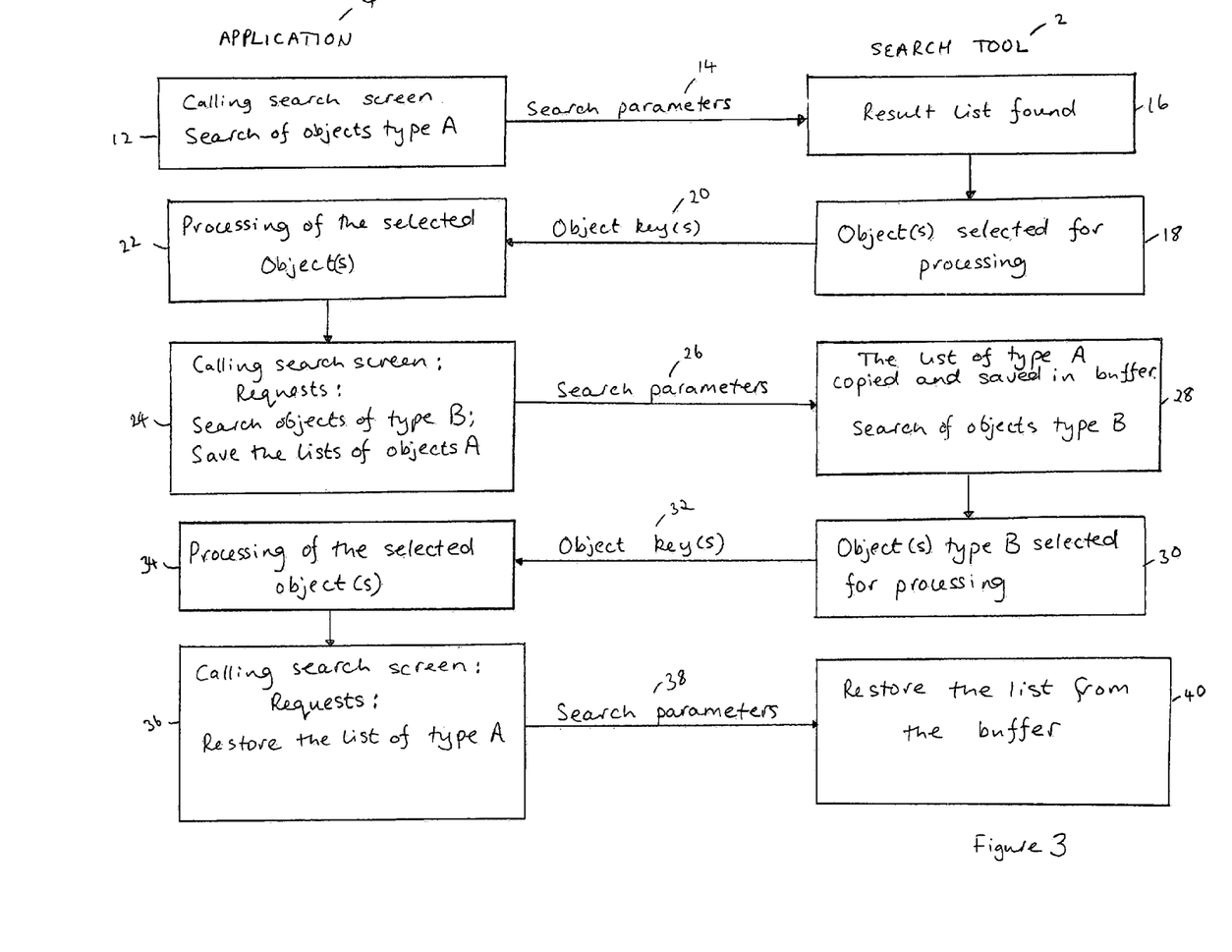
FIG. 3 shows the interaction between an application and a generic search tool according to an embodiment of the invention.

FIG. 1 shows a block diagram of a computer based system including a search tool and a plurality of applications according to an embodiment of the invention. In particular, FIG. 1 shows a search tool 2, in particular, a generic search tool. One or more applications 4, typically a plurality of applications, use the generic search tool 2. The one or more applications may be applications from mySAP SRM or other business systems or the like. One application may be a purchase order application having an object type: purchase order. Another application may be an invoice application having an object type: invoice. One or more of the applications may use the generic search tool at a time. However, the one or more applications do not necessarily "see", i.e. communicate with one another or use some common data. Each of the one or more applications may work independently from the other one or more applications. Further, each of the one or more applications may have its own data and may also work with its own search parameters and result. For example, in one embodiment described in more detail below with reference to FIG. 3, a search tool searches for one or more purchase orders while creating or changing an invoice. In such an embodiment, the purchase order application is not necessarily working in parallel with the invoice application and does not search for its objects (purchase orders). In FIG. 1, the one or more applications, for example, an invoice application may call for the generic search tool with a request for a different object type—purchase orders. In such an embodiment, only one application, the invoice application, is working with the search tool. Similarly, in a further embodiment, the purchase order application may call for the generic search tool with a request for a different object type—shopping carts. It is of course possible, in a further embodiment, that one application switches to another one at a runtime or uses parts of the programs on which another application is based. A buffer 6 is provided. In FIG. 1, the buffer 6 is indicated as being a separate entity from the search tool 2. In an alternative embodiment, the search tool 2 includes the buffer 6. The buffer 6 is a part of or in communication with the search tool 2. By implementing a buffering possibility with or within the generic search tool 2, an application can control saving and restoring of a result list with using special parameters belonging to the generic search parameters. The function of the generic search parameters, described in more detail with reference to FIG. 3, is to bring parameters from the application 4 to the search tool 2. For example, the names of the object or structure of the result list. The new parameter are the flags for reading the buffer 6 and saving the current list in the buffer 6. Examples of parameters are given in Table 1. In this way, a switching technique between object types is allowed. Any application 4 of the one or more applications 4 using the generic search tool can use the switching mechanism for processing two types of objects without losing information. For example, in invoicing: a list of invoices is found. One invoice is selected for processing. The user wants to add new items to the invoice based on purchase orders. To do this, the user switches to a purchase order search. The list of purchase orders is found and some of them are transferred to the invoice. After completing the invoice processing the user returns to the list of invoices. In a further example, in purchasing: a list of purchase orders is found. One purchase order is selected for processing. The user wants to add new items based on shopping carts as templates and switches to the shopping cart search. The list of shopping carts is found, some of them are used as templates for the purchase order. After completing the purchase order processing the user then returns to the list of purchase orders. It is seen that in this way, the search tool is able to switch between searches for objects having differing types, without data being lost. Further, once a second search for a second object type is carried out, the user can resume his work on the list of results of the search for objects of a first type.

Figure 2:
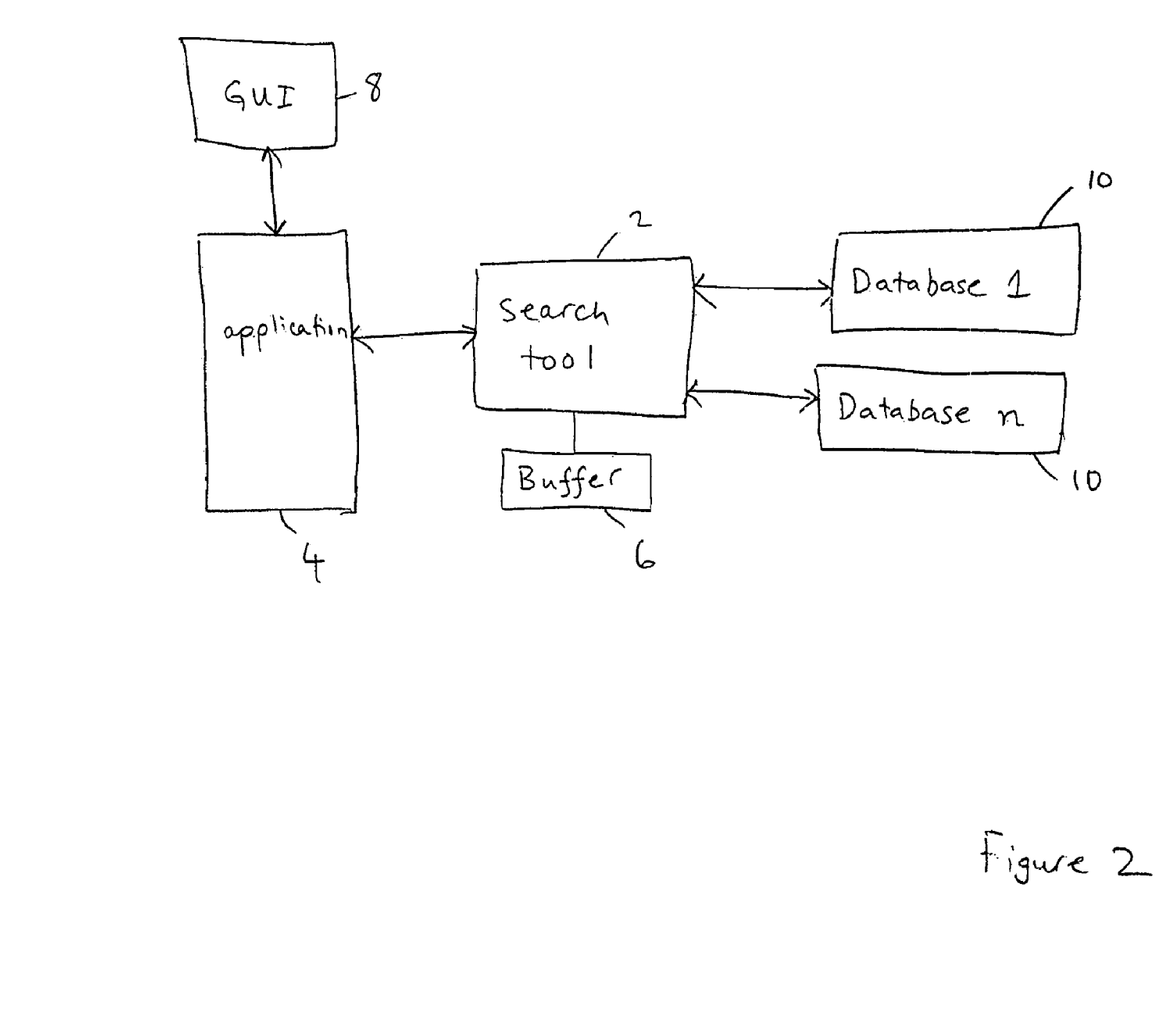
FIG. 2 shows a block diagram of details of the computer based system shown in FIG. 1 according to an embodiment of the invention.

FIG. 2 shows a block diagram of details of the computer based system shown in FIG. 1 according to an embodiment of the invention. In particular, FIG. 2 shows a search tool 2 which may be used by an application 4. The application 4 is provided or includes a graphic user interface 8 with which the user interacts with the application 4. The search tool 2 includes or is in communication with a buffer 6. Further, the search tool 2 searches data stored in one or more databases 10.

FIG. 3 shows the interaction between an application 4 and a generic search tool 2 according to an embodiment of the invention. According to an embodiment of the invention, the process includes the following steps: a list of objects, hereinafter referred to as a current list, of a first type, type A, is found. An object or a plurality of objects are selected for processing. The application demands that the current list be saved. A new list is created with the same structure as the current list. The current list is copied. The application leaves the search screen for processing the selected object or objects. The search tool is called again to find a list of objects of a second type, type B, for example, in order to add them to a selected object as reference. The processing of the selected object or objects is completed. The application returns to the search of objects of the first type, type A. The application "tells" the search tool that the original list should be restored. The search tool checks if the structure of the saved list is compatible with that of the current list. If the structures are equal, the current list is filled from the buffer 6. This interaction is shown in more detail in FIG. 3. In particular, FIG. 3 shows which steps are carried out by the application 4 and by the search tool 2 and the data which is exchanged between the application 4 and the search tool 2. In the application, the calling search screen: Search for objects type A is entered (step 12), the search parameters are transferred to the search tool (step 14). The search criteria are shown dynamically in the search screen. The search parameters define the structure of the result list. In particular, the search parameters defined the function module that fulfils the search. On receipt of the search parameters, the search tool 2 outputs the found results in a list (Result list found) (step 16). Within the search tool 2, the object or objects are selected for processing (step 18). Object key or keys are returned to the application 4. The object key(s) identify the objects. The application is not provided with the whole list of results. Instead only selected objects are provided to the application in order to identify the object or objects (step 20).

The application then processes the selected object or objects (step 22). In particular, the application processes the selected object or objects in accordance with an action. The application 4 carries out one or more actions in a prescribed manner. For example, an action may be shown to a user, via the graphic user interface 8, as an icon. Subsequently, in the application, the calling search screen: Requests to the search tool: Search objects of type B: Save the list of objects A (step 24). The search parameters, for example, those unique with respect to type B are transferred to the search tool (step 26). On receipt of the Requests and the Search parameters, the list of type A is copied and saved in the buffer by the search tool. Further, the search of objects type B is carried out by the search tool (step 28). Within the search tool 2, the object or objects of type B are selected for processing (step 30). Object key or keys identifying objects of type B are returned to the application 4 (step 32). Subsequently, the application 4 processes the selected object or objects of type B in accordance with an action (step 34). Subsequently, in the application, the calling search screen: Requests to the search tool: Restore the list of type A objects is made (step 36). Further the search parameters for type A are transferred to the search tool (step 38). Finally, the search tool, restores the list from the buffer (step 40).

According to one or more embodiments of the present invention, it is not necessary to have a result list for each application. There is only one dynamical result list which gets its structure at a run time. The same is true for the subordinate lists (items). The function module carrying out the search is called dynamically. Further, an alternative function module with the same interface may be used instead of the search function module, if necessary. One or more of the functions for the result list (sorting, expanding, selecting, updating, now buffering), or any combination thereof, may be used dynamically for the one or more of the applications. The ABAP screens (DynPros) for the result list are generated at a run time. If a result structure has been changed, it is not necessary to apply the changes manually, it is enough to regenerate the corresponding screen. In this embodiment, a report may trigger generating the screen. The one or more applications may use the same screen with the search criteria. The search criteria are activated or deactivated due to the information coming from the applications. Further, it is easy to integrate the generic search tool into an application.

As described above, search parameters may be sent from one or more of the applications to the generic search tool. Examples of search parameters are given in Table 1, below.

TABLE 1

| 1. Parameter | 2. Description |
| --- | --- |
| IS_USER_INFO | User information: Type, GUID, User ID |
| IS_APPLICATION_INFO | Object type to be found; Object type to be created |
| IV_FCODE | OK code |
| IV_CRITERIA_SCREEN_EMPTY | Flag: the search criteria screen should be deactivated |
| IV_RESULT_SCREEN_EMPTY | Flag: the search results screen should be deactivated |
| IV_LIST_CHANGE | The kind of changes in the list |
| IV_MULTISEL | Flag: multiple selection for the headers |
| IV_SUB_MULTISEL | Flag: multiple selection for the items |
| IV_MULTI_EXPANDED | Flag: multiple expanding allowed |
| IV_ADDITIONAL_CRITERIA | Flag: extended search criteria set |
| IV_MAINLIST_INTERNAL | The DDIC name of the header list structure with additional fields |
| IV_MAINLIST_WEB | The DDIC name of the header list structure shown in Web Browser |
| IV_SUBLIST_INTERNAL | The DDIC name of the item list structure with additional fields |
| IV_SUBLIST_WEB | The DDIC name of the item list structure shown in Web Browser |
| IV_ADDLIST_INTERNAL | The DDIC name of the additional information list structure |
| IV_ADDLIST_INTERNAL | The DDIC name of the additional information list structure shown in Web Browser |
| IV_HEADER_STRUCTURE | The header structure |
| IV_MAINLIST_FUNCTION | The name of the function module for searching for the header objects |
| IV_SUBLIST_FUNCTION | The name of the function module for searching for the item objects (expanding) |
| IV_RESULT_SCREEN | The screen number for the search result |
| IV_TAB_HEIGHT | The height of the generated table control |
| IT_FIELD_CONTROL_LIST | Search criteria (possible with headlines) |
| IT_MAINLIST_FIELDS_DISABLE | The fields to be excluded from the header list |
| IT_SUBLIST_FIELDS_DISABLE | The fields to be excluded from the item list |
| IT_MAINLIST_COLUMN_TITLE | Headlines for the header list columns |
| IT_SUBLIST_COLUMN_TITLE | Headlines for the header list columns |
| IV_BUFFER_SAVE | Flag: save the current result list in the buffer |
| IV_BUFFER_READ | Flag: restore the result list from the buffer |

Figure 4:
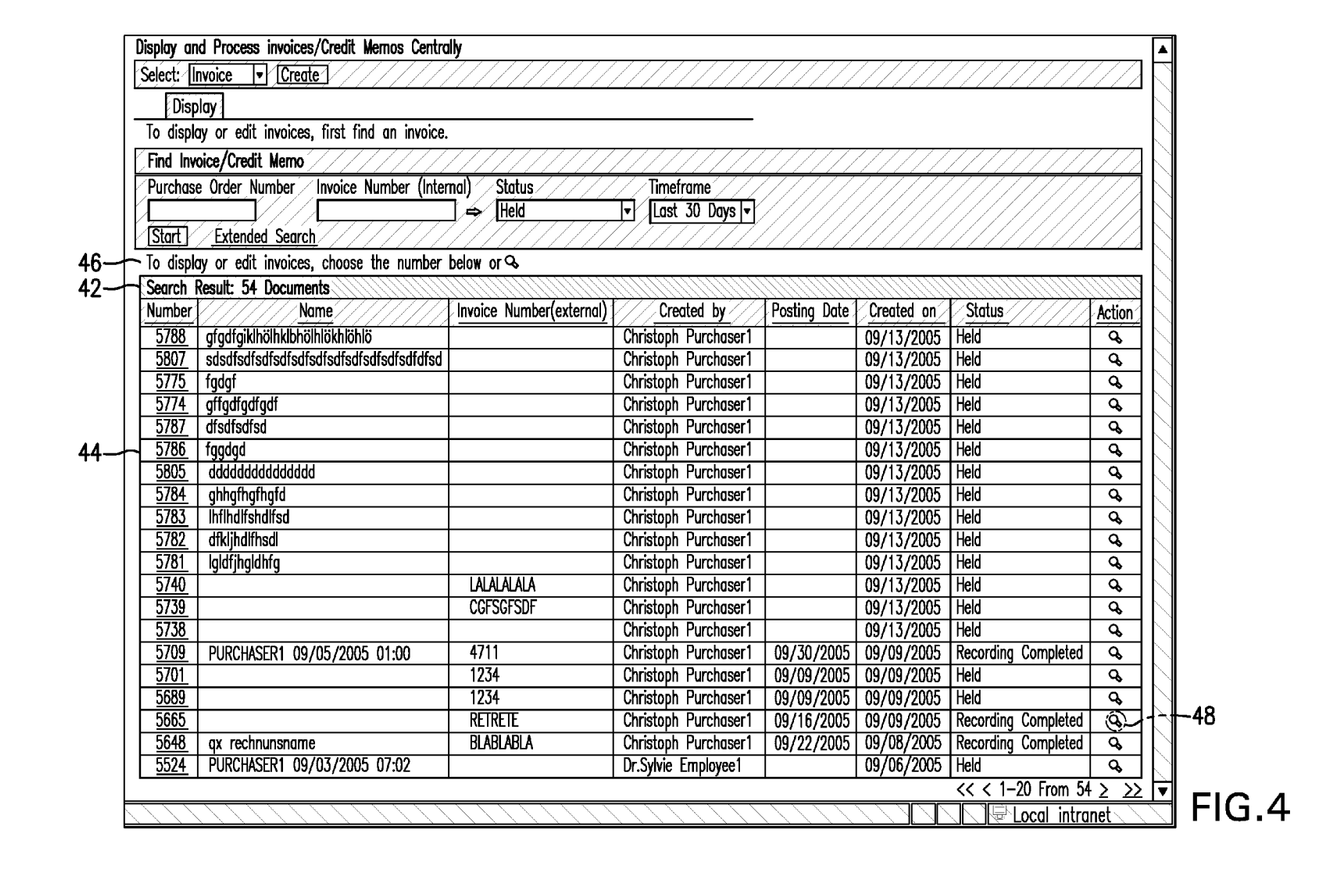

FIGS. 4 to 9 depict screen shots of an example, according to an embodiment of the invention, in which purchase orders are searched to be added to an invoice. In particular, FIG. 4 shows list of objects of type A which are invoices. FIG. 4 shows the search result 42. The search result 42 includes a list of the invoices 44 found. To display or edit invoices, the user is invited to choose the number of the invoice shown or to click on the magnifying glass icon 46. In FIG. 4, one invoice is selected 48. In FIG. 4, the invoice is selected by clicking on the magnifying glass icon. The circle shown in FIG. 4 is to illustrate that the invoice has been selected.

Figure 5:
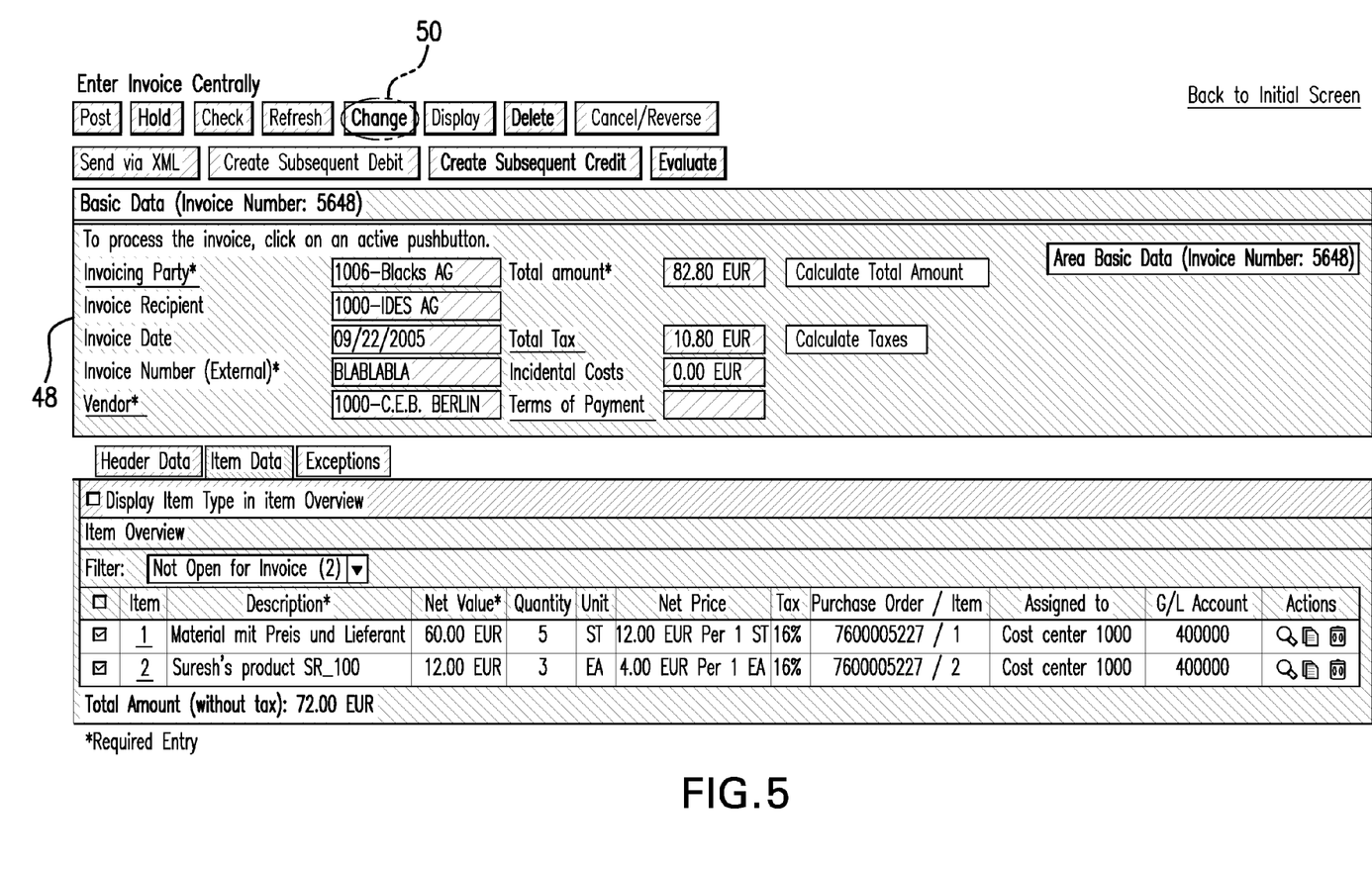
Figure 6:
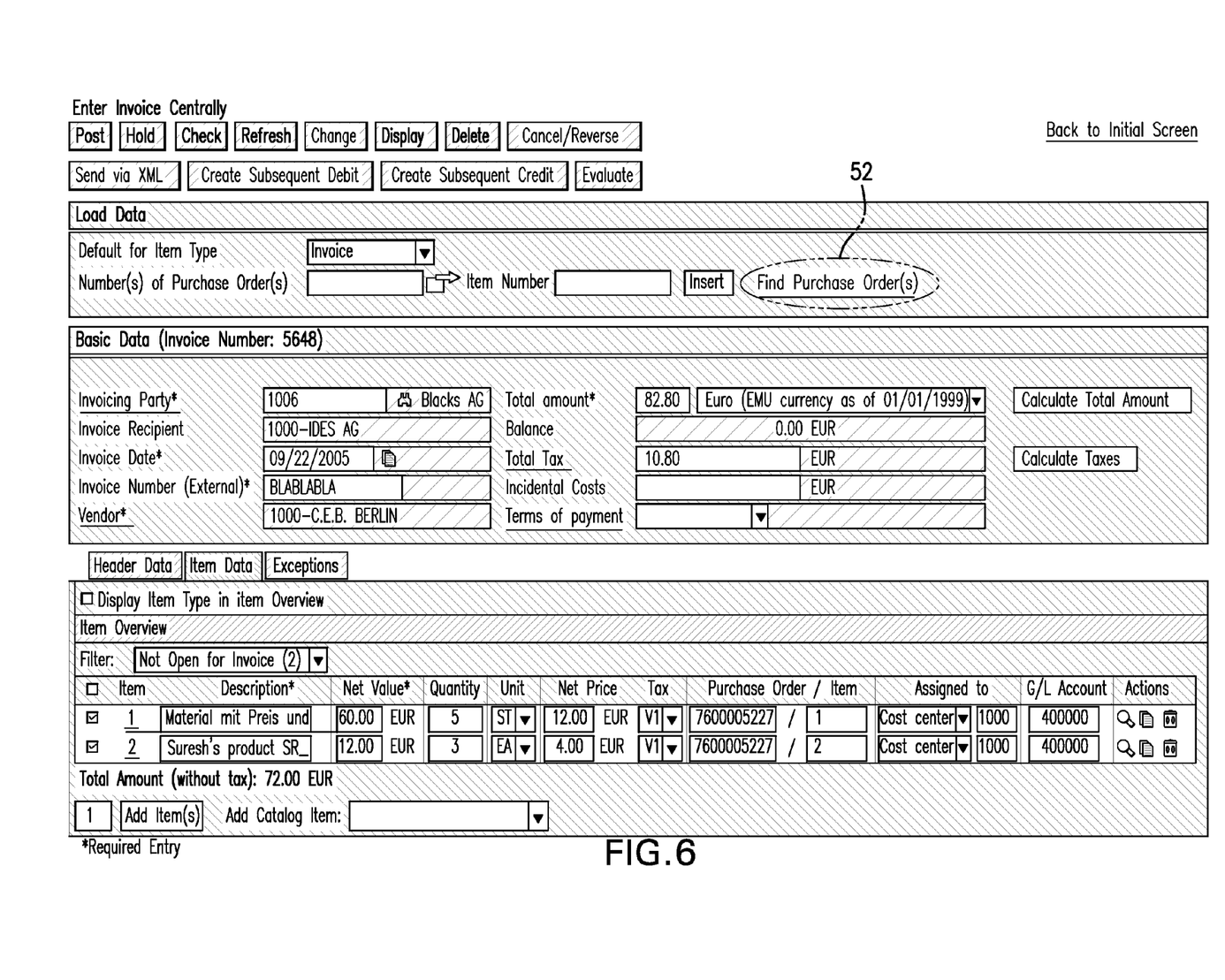
Figure 8:
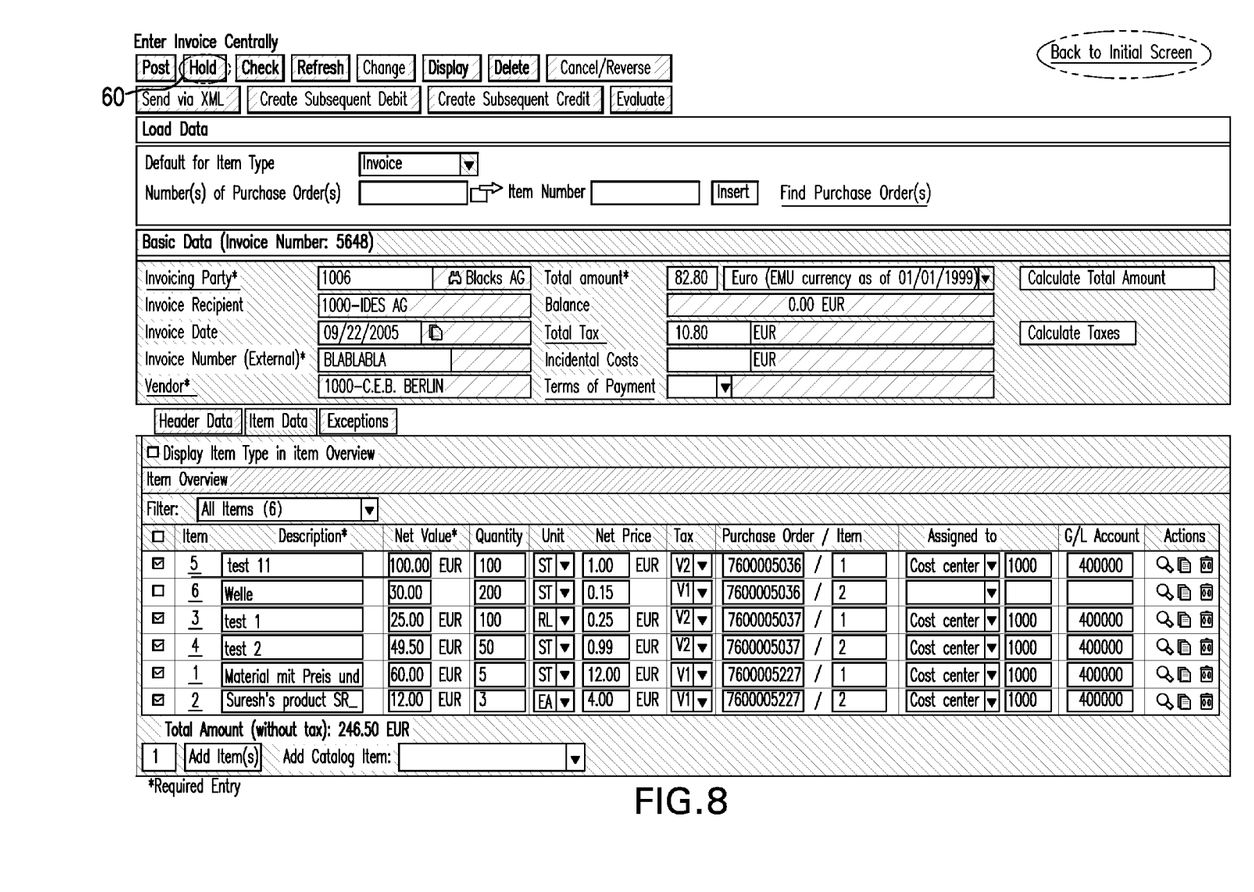
Figure 9:
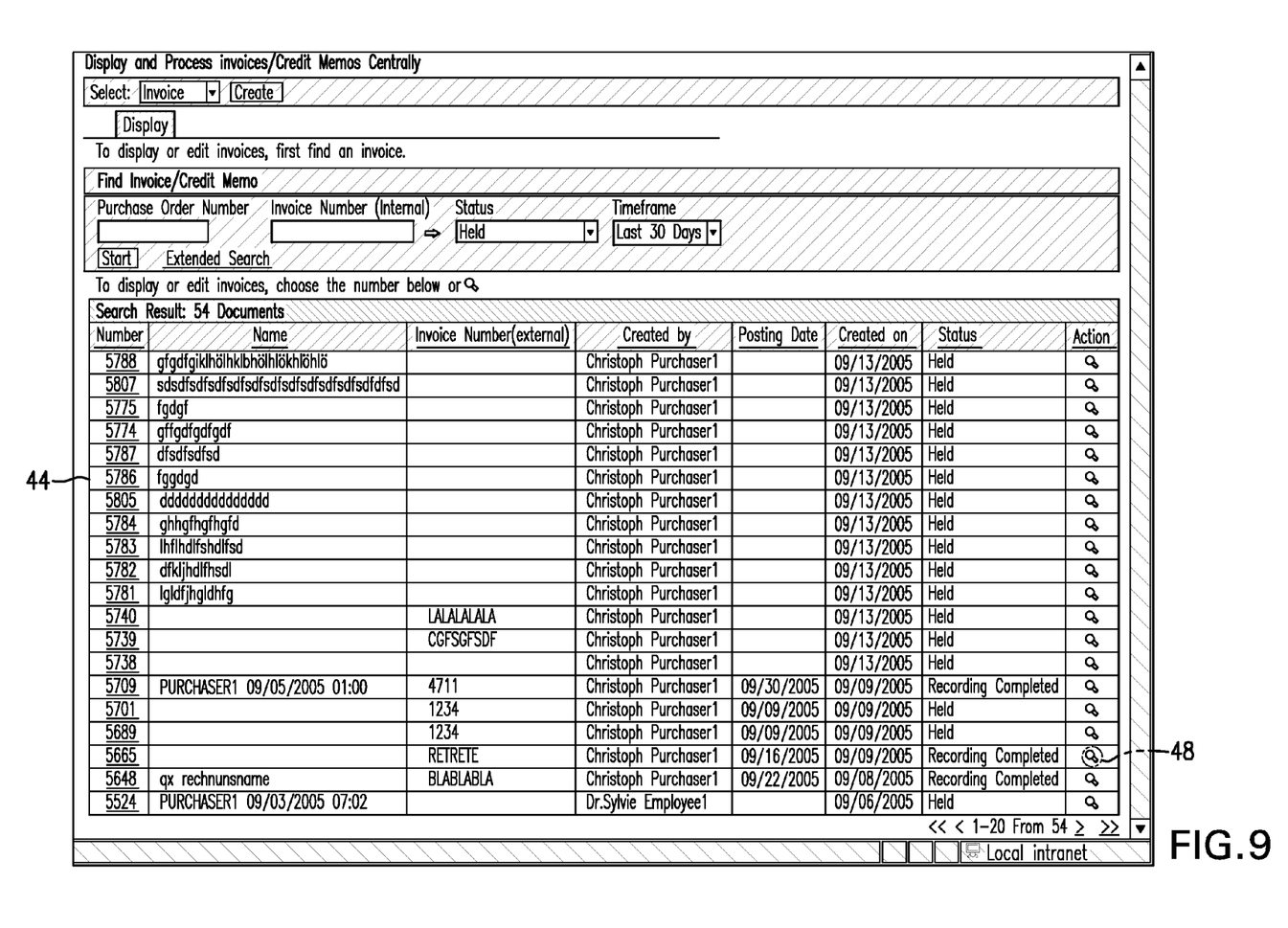

FIG. 5 shows how the selected invoice 48 can be changed. A change icon 50 is provided which a user can activate, for example, by clicking on with a mouse. FIG. 6 shows how the user may wish to change the selected invoice 48 by searching for new purchase order for the invoice. The purchase orders have a second object type, type B, differing from the object type, type A, of the invoices. Purchase orders for the invoice are searched by activating the icon Find Purchase Orders 52. FIG. 7 shows the search result 54 of the search for purchase orders carried out by the search tool. The found purchase orders are provided in a list of results 56. Purchase orders 57, 58 are selected to be added to the selected invoice 48. The purchase orders may be selected by ticking the check boxes provided alongside the purchase orders in the result list 56. The selected purchase orders 57, 58 are subsequently added to the selected invoice 48 with the help of the button "Add Purchase Orders". FIG. 8 shows the finishing of the processing of the purchase order to complete the invoice. This is carried out by activating the hold icon 60. FIG. 9 shows the restoration of the list of invoices which formed the list of results of the search for objects of type A. The user can now carry on processing the list of invoices 44 without any data having been lost.

It should be noted that the above-mentioned embodiments illustrate rather than limit the invention, and that those skilled in the art will be able to design alternatives. For example, the computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

What is claimed is:

1. A computer implemented method comprising:
    transferring a first set of search parameters from a first application to a generic search tool, the first set of search parameters to include an indication to search for a first type of object;
    searching one or more databases to generate a first list of object keys identifying objects of the first type as a function of the first set of search parameters;
    returning the first list of results to the first application;
    selecting one or more first type objects identified by object keys from the first list of object keys for processing;
    processing the selected first type objects, wherein the processing includes invoking a second application to search the one or more database for objects having a second type of object;
    transferring a second set of search parameters from the second application to the generic search tool, the second set of search parameters to include an indication to search for the second type of object;
    storing a copy of the first list of object keys in a buffer in response to the second set of search parameters being received by the generic search tool;
    searching the one or more databases to generate a second list of object keys identifying objects of the second type as a function of the second set of search parameters;
    returning the second list of results to the second application;
    selecting one or more second type objects identified by object keys from the second list of object keys for processing;
    further processing the selected second type objects to modify a selected first type object based on the selected second type objects;
    transferring a third set of search parameters from the first application to the generic search tool, the third set of search parameters to include an indication to search for the first type of object;
    retrieving the copy from the buffer in response to determining that the third set of search parameters match the first set of search parameters; and
    searching the one or more databases to generate a third list of object keys identifying objects of the first type as a function of the third set of search parameters in response to determining that the third set of search parameters do not match the first set of search parameters.

2. The method according to claim 1, further comprising: providing the first and second results lists on a display such that a user can select from at least one of the first and second lists of results, a result to be processed.

3. The method according to claim 2, wherein processing and further processing of the selected objects are in accordance with actions provided on the display.

4. A method according to claim 1, wherein the search request includes a search parameter defining a structure of at least one of the first and second list of results.

5. A method according to claim 1, including providing one or more object keys to the first or second application to identify the object type.

6. A method according to claim 1, wherein a user requests in the first application that the first result list be restored.

7. An apparatus, comprising:
    a display;
    a processor; and
    a memory coupled to the processor, the memory storing instructions adapted to be executed by the processor to:
        transfer a first set of search parameters from a first application to a generic search tool, the first set of search parameters to include an indication to search for a first type of object;
        search one or more databases to generate a first list of object keys identifying objects of the first type as a function of the first set of search parameters;
        return the first list of results to the first application;
        select one or more first type objects identified by object keys from the first list of object keys for processing;
        process the selected first type objects, wherein the processing includes invoking a second application to search the one or more database for objects having a second type of object;
        transfer a second set of search parameters from the second application to the generic search tool, the second set of search parameters to include an indication to search for the second type of object;
        store a copy of the first list of object keys in a buffer in response to the second set of search parameters being received by the generic search tool;
        search the one or more databases to generate a second list of object keys identifying objects of the second type as a function of the second set of search parameters;
        return the second list of results to the second application;
        select one or more second type objects identified by object keys from the second list of object keys for processing;
        further process the selected second type objects to modify a selected first type object based on the selected second type objects;
        transfer a third set of search parameters from the first application to the generic search tool, the third set of search parameters to include an indication to search for the first type of object;
        retrieve the copy from the buffer in response to determining that the third set of search parameters match the first set of search parameters; and
        search the one or more databases to generate a third list of object keys identifying objects of the first type as a function of the third set of search parameters in response to determining that the third set of search parameters do not match the first set of search parameters.

8. The method according to claim 7, further comprising: providing the first and second results lists on the display such that a user can select from at least one of the first and second lists of results, a result to be processed.

9. The method according to claim 2, wherein processing and further processing of the selected objects are in accordance with actions provided on the display.

10. A method according to claim 7, wherein the search request includes a search parameter defining a structure of at least one of the first and second list of results.

11. A method according to claim 7, including providing one or more object keys to the first or second application to identify the object type.

12. A method according to claim 7, wherein a user requests in the first application that the first result list be restored.

13. An article comprising a machine readable medium that stores machine-executable instructions that when applied to a machine, cause the machine to:

transfer a first set of search parameters from a first application to a generic search tool, the first set of search parameters to include an indication to search for a first type of object;
  search one or more databases to generate a first list of object keys identifying objects of the first type as a function of the first set of search parameters;
  return the first list of results to the first application;
  select one or more first type objects identified by object keys from the first list of object keys for processing;
  process the selected first type objects, wherein the processing includes invoking a second application to search the one or more database for objects having a second type of object;
  transfer a second set of search parameters from the second application to the generic search tool, the second set of search parameters to include an indication to search for the second type of object;
  store a copy of the first list of object keys in a buffer in response to the second set of search parameters being received by the generic search tool;
  search the one or more databases to generate a second list of object keys identifying objects of the second type as a function of the second set of search parameters;
  return the second list of results to the second application;
  select one or more second type objects identified by object keys from the second list of object keys for processing;
  further process the selected second type objects to modify a selected first type object based on the selected second type objects;
  transfer a third set of search parameters from the first application to the generic search tool, the third set of search parameters to include an indication to search for the first type of object;
  retrieve the copy from the buffer in response to determining that the third set of search parameters match the first set of search parameters; and
  search the one or more databases to generate a third list of object keys identifying objects of the first type as a function of the third set of search parameters in response to determining that the third set of search parameters do not match the first set of search parameters.

14. The method according to claim 13, further comprising: providing the first and second results lists on a display such that a user can select from at least one of the first and second lists of results, a result to be processed.

15. The method according to claim 14, wherein processing and further processing of the selected objects are in accordance with actions provided on the display.

16. A method according to claim 13, wherein the search request includes a search parameter defining a structure of at least one of the first and second list of results.

17. A method according to claim 13, including providing one or more object keys to the first or second application to identify the object type.

18. A method according to claim 13, wherein a user requests in the first application that the first result list be restored.

* * * * *